(12) United States Patent
Choi et al.

(10) Patent No.: US 8,145,906 B2
(45) Date of Patent: Mar. 27, 2012

(54) BINDING UPDATE METHOD IN MIPV6

(75) Inventors: Hyoung Kee Choi, Seoul (KR); Se Hwa Song, Seoul (KR); Eun Young Lee, Nonsan-si (KR); Yi Jin Im, Daegu (KR); In Hwan Kim, Suwon-si (KR); Yae Hoe Kim, Seoul (KR)

(73) Assignee: Sungkyunkwan University Foundation for Corporate Collaboration, Cheoncheon-Dong, Jangan-Gu, Gyeonggi-Do, Suwon (KR)

( * ) Notice: Subject to any disclaimer, the term of this patent is extended or adjusted under 35 U.S.C. 154(b) by 583 days.

(21) Appl. No.: 12/391,374

(22) Filed: Feb. 24, 2009

(65) Prior Publication Data

US 2010/0031356 A1 Feb. 4, 2010

(30) Foreign Application Priority Data

Jul. 29, 2008 (KR) ........................ 10-2008-0074279

(51) Int. Cl.
*H04L 29/06* (2006.01)
(52) U.S. Cl. ...................................................... 713/168
(58) Field of Classification Search .................... 713/168
See application file for complete search history.

(56) References Cited

U.S. PATENT DOCUMENTS

| 2004/0179668 | A1* | 9/2004 | Gilbert et al. | 379/210.01 |
| 2007/0088853 | A1* | 4/2007 | Lee et al. | 709/249 |
| 2008/0291885 | A1* | 11/2008 | Miao et al. | 370/338 |

FOREIGN PATENT DOCUMENTS

KR 1020060117812 11/2006

* cited by examiner

*Primary Examiner* — Jason Gee
(74) *Attorney, Agent, or Firm* — Lexyoume IP Group, PLLC

(57) ABSTRACT

Provided is a binding update method in MIPv6 which includes: a first step of generating, with a mobile node, a HoTI (Home Test Init) message and transmitting the HoTI message to a corresponding node; a second step of generating a CoTI (Care of Test Init) message and transmitting the CoTI message to the corresponding node; a third step of generating, with the corresponding node, a HoT (Home of Test) message and transmitting the HoT message to the mobile node; a fourth step of generating a CoT (Care-of Test) message and transmitting the CoT message to the mobile node; a fifth step of generating, with the mobile node, a BU (Binding Update) message and transmitting the BU message to the corresponding node; and a sixth step of verifying, with the corresponding node, the BU message and transmitting a BA (Binding Ack) message to the mobile node.

7 Claims, 3 Drawing Sheets

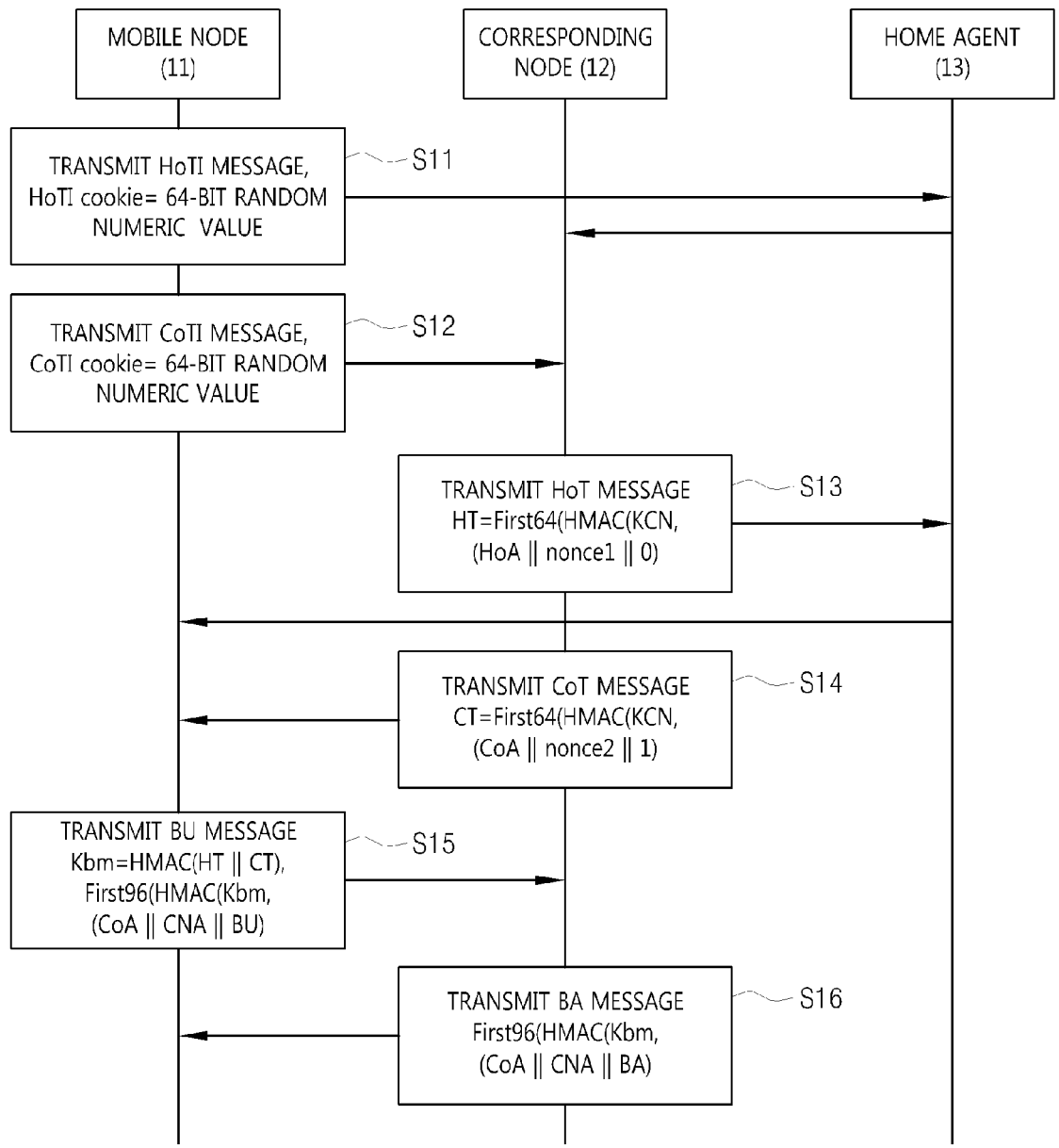

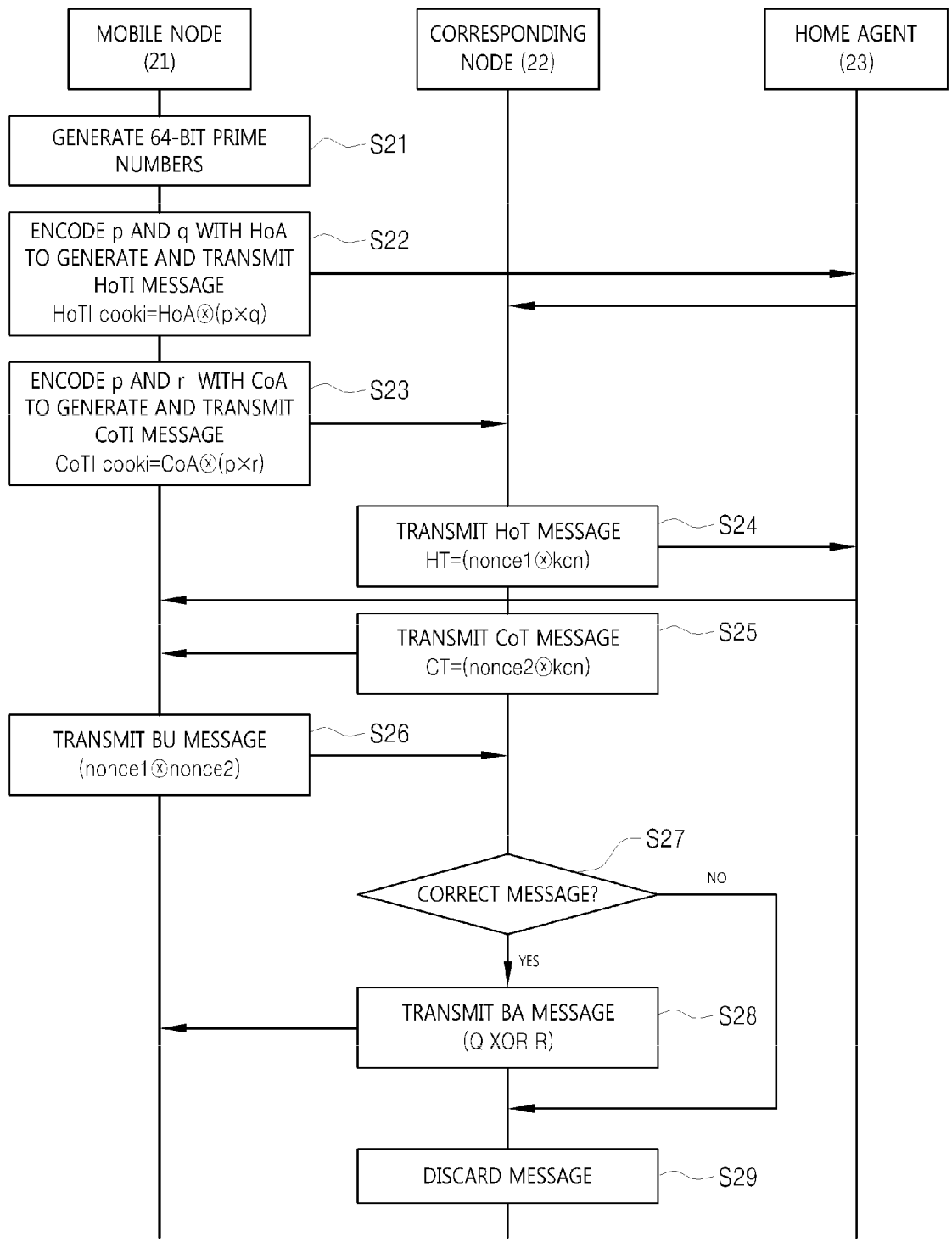

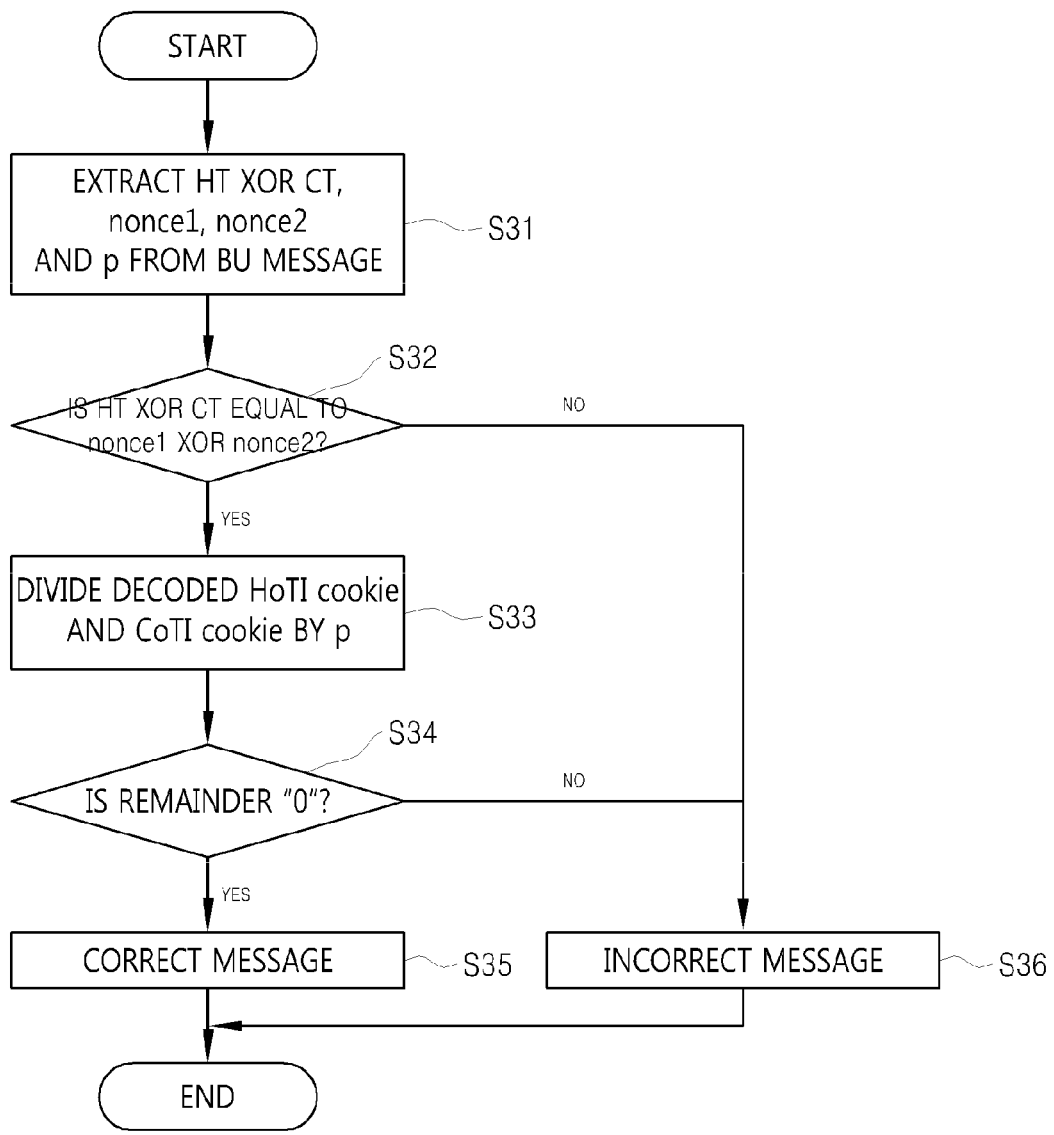

BINDING UPDATE METHOD IN MIPV6

CROSS-REFERENCE TO RELATED APPLICATION

This application claims priority to and the benefit of Korean Patent Application No. 10-2008-0074279 filed in the Korean Intellectual Property Office on Jul. 29, 2008, the entire contents of which are incorporated herein by reference.

BACKGROUND

1. Technical Field

The present invention relates to a binding update method in the MIPv6 (Mobile Internet Protocol version 6), and more particularly, to a binding update method in the MPIv6 that can intercept an attacker's attack to guarantee a safe communication.

2. Related Art

In the MIPv6, communication nodes in the Internet can communicate with each other while freely changing linked networks.

In the MIPv6, a communication node that can change its point of attachment from one link to another link is referred to as a mobile node (MN) and an equivalent communication node that is communicating with the mobile node is referred to as a corresponding node (CN). The corresponding node may be stationary or dynamic.

The mobile node can continuously communicate by the use of a home address (HoA) which is an IP address assigned to the mobile node in its own home link, when it moves from one link to another link. That is, when the mobile node visits a foreign link other than the home link, a care-of address (CoA) which is an IP address linked to the mobile node is assigned to the mobile node and the mobile node should notify the CoA to the corresponding node.

Accordingly, when the mobile node departs from its home link and moves to a foreign link, the mobile node performs a binding update procedure of registering the assigned CoA in a home agent (HA) and the corresponding node.

FIG. 1 is a diagram illustrating a binding update method in the MIPv6 according to the related art.

Referring to FIG. 1, a mobile node 11 first performs a return routability (RR) procedure of determining whether the mobile node itself is a correct node for performing the binding update procedure.

To acquire a home keygen token (HT) and a care of keygen token (CT) from a corresponding node 12, the mobile node 11 generates a home test init (HoTI) message and a care of test init (CoTI) message (S11 and S12), transmits the HoTI message to the corresponding node 12 through a home agent 13, and transmits the CoTI message directly to the corresponding node 12.

Then, the corresponding node 12 having received the HoTI message and the CoTI message verifies the mobile node 11. That is, the corresponding node 12 generates the HT and a first nonce nonce1 corresponding to the HoTI message and the CT and a second nonce nonce2 corresponding to the CoTI message and generates a home of test (HoT) message including the HT and the first nonce nonce1 and a care-of test message (CoT) message including the CT and the second nonce nonce2 (S13 and S14).

The corresponding node 12 transmits the HoT message to the mobile node 11 through the home agent 13 and transmits the CoT message directly to the mobile node 11.

When the mobile node 11 having received the HoT message and the CoT message successfully performs the RR procedure, the mobile node 11 a binding update procedure of notifying the corresponding node 12 of its CoA.

That is, the mobile node 11 acquires the HT and the CT from the HoT message and the CoT message, respectively, generates a binding update (BU) message including the tokens HT and CT, and transmits the BU message to the corresponding node 12 (S15).

Then, the corresponding node 12 acquires the first and second nonces nonce1 and nonce2 from the BU message, reconstructs the HT and the CT, generates a response message on the basis of a message authentication code and the BU message (S16), and transmits the response message to the mobile node 11.

However, in the binding update method according to the related art, a communication section between the mobile node 11 and the home agent 13 in the indirect path and the direct path in the MIPv6 is protected with the IPSec but the other communication section is not protected at all.

In the communication section other than the section between the mobile node 11 and the home agent 13, an attacker can intercept the session of the mobile node 11. That is, when the attacker is located between the home agent 13 and the corresponding node 12, the attacker acquires the HT, transmits the CoTI message to the corresponding node 12 by the use of its CoA, and is provided with the CT. Then, the attacker can perform the binding update procedure using two tokens (the HT of the mobile node 11 and the CT of the attacker).

This is because no connectivity exists in two tokens constituting the Kbm used in the binding update procedure. To defend a service rejection attack, the corresponding node 12 does not hold a status but holds the tokens, the nonces, and indexes of the nonces, before receiving the BU message. That is, the corresponding node 12 does not store what mobile node 11 is performing the RR procedure.

Therefore, the corresponding node 12 can only generate tokens with reference to only a source address of the init message but cannot add information in common to two tokens.

Conclusively, since the CT of the attacker and the HT of the mobile node 11 are used to generate the Kbm, the corresponding node recognizes that the CoA of the attacker and the HoA of the mobile node 11 are routed to the same place. Then, the subsequent communication is made using the CoA of the attackers, which means that the attack is successful.

When such an attack is made while a user is receiving important data, the security of information is severely threatened.

SUMMARY

An advantage of some aspects of the invention is that it provides a binding update method in the MIPv6 that can intercept an attack in all communication sections to guarantee a safe communication.

Another advantage of some aspects of the invention is that it provides a binding update method in the MIPv6 that can a load of a verification operation.

According to an aspect of the invention, there is provided a binding update method in MIPv6, including: a first step of allowing a mobile node to generate a HoTI (Home Test Init) message including a HoA (Home Address) encoded with a product of a first prime number and a second prime number and to transmit the HoTI message to a corresponding node through a home agent along with a first index; a second step of allowing the mobile node to generate a CoTI (Care of Test Init) message including a CoA (Care-of Address) encoded with a product of the first prime number and a third prime number and to transmit the CoTI message directly to the corresponding node along with a second index; a third step of allowing the corresponding node to generate a HoT (Home of Test) message including a first nonce and to transmit the HoT message to the mobile node through the home agent; a fourth step of allowing the corresponding node to generate a CoT (Care-of Test) message including a second nonce and to transmit the CoT message to the mobile node; a fifth step of allowing the mobile node to generate a BU (Binding Update) message by adding the first prime number to the first nonce and the second nonce included in the HoT message and the CoT message and to transmit the BU message to the corresponding node; and a sixth step of allowing the corresponding node to verify the BU message using an exclusive OR operation and a factorization operation in prime numbers with the first prime number and to transmit a BA (Binding Ack) message to the mobile node.

The first step may include performing an exclusive OR operation on the product of the first prime number and the second prime number and the HoA to encode the HoA.

The second step may include performing an exclusive OR operation on the product of the first prime number and the third prime number and the CoA to encode the CoA.

The third step may include generating a secret node key of the corresponding node and the first nonce and performing an exclusive OR operation on the secret node key and the first nonce to generate the HoT message.

The fourth step may include generating a secret node key of the corresponding node and the second nonce and performing an exclusive OR operation on the secret node key and the second nonce to generate the CoT message.

The sixth step may include: extracting the first index and the second index included in the BU message; decoding the first index and the second index by an exclusive OR operation and separating the secret node key of the corresponding node, the first nonce, the second nonce, HoCookie, and CoCookie from the BU message; performing a factorization operation in prime numbers on the HoCookie and the CoCookie using the first primer number included in the BU message; and confirming that the BU message is a correct message and transmitting the BA message to the mobile node, when the factorization operation in prime numbers is normally performed.

The sixth step may include confirming that the BU message is an abnormal message when the exclusive OR operation or the factorization operation in prime numbers is not normally performed.

In the binding update method in the MIPv6 according to the aspect of the invention, the mobile node and the corresponding node are made to share information by the RR procedure, the mobile node generates and transmits the BU message including the shared information, and the corresponding node verifies the BU message by the use of the shared information.

By completing the BU operation only when the mobile node having normally performed the RR procedure transmits the BU message, it is possible to intercept an attack and to guarantee a safe communication.

By performing the operation of verifying the BU message using the factorization in prime numbers, it is possible to reduce the load of the verification operation and to rapidly process the binding update operation.

BRIEF DESCRIPTION OF THE DRAWINGS

FIG. 1 is a diagram illustrating a binding update method in the MIPv6 according to a related art.

FIG. 2 is a diagram illustrating a binding update method in the MIPv6 according to an embodiment of the invention.

FIG. 3 is a diagram illustrating in detail a binding message verifying procedure according to an embodiment of the invention.

DESCRIPTION OF EXEMPLARY EMBODIMENTS

Hereinafter, an embodiment of the invention will be described in detail with reference to the accompanying drawings so as to be easily put into practice by those skilled in the art. However, the invention is not limited to the embodiment, but can be modified in various forms.

Elements not directly associated with the invention are omitted in the drawings to clearly describe the invention and like elements are referenced by like reference numerals or signs all over the specification.

When an element "includes" another element, it means that the element excludes other elements but may further include other elements as long as the opposite description is not particularly made.

FIG. 2 is a diagram illustrating a binding update method in the MIPv6 according to an embodiment of the invention.

Referring to FIG. 2, a mobile node 21 generates three 64-bit prime numbers p, q, and r (S21) before performing the RR procedure.

The three primer numbers generated in step S21 are used to verify that a requester for two tokens HT and CT to be generated later by a corresponding node 22 is the mobile node 21 having requested for the RR procedure.

The mobile node 21 performs an exclusive OR operation on a HoA with a production of p and q to generate a HoCookie and transmits a HoTI message including the HoCookie to the corresponding node 22 through a home agent 23 (S22), similarly to the related art.

The mobile node 21 performs an exclusive OR operation on a CoA with a product of p and r to generate a CoCookie and transmits a CoTI message including the CoCookie directly to the corresponding node 22.

Since the HoCookie and the CoCookie are encoded with the product of p and q and the product of p and r, respectively, they have p as a common divisor. The common divisor p enables to verify the BU message by a factorization operation in prime numbers later. This will be described in detail later.

The corresponding node 22 having received the HoTI message and the CoTI message generates first and second nonces nonce1 and nonce2 and stores the HoCookie included in the HoTI message and the first nonce nonce1 to be correlated with a first index index1. The corresponding node 22 also stores the CoCookie included in the CoTI message and the second nonce nonce2 to be correlated with a second index index2. The first and second indexes index1 and index2 are included in the BU message. Accordingly, when the corresponding node acquires the first and second indexes index1 and index2, the corresponding node can know the HoCookie included in the HoTI message, the CoCookie included in the CoTI message, and the nonce generated by the corresponding node.

The corresponding node generates a HoT message and a CoT message, transmits the HoT message to the mobile node 21 through the home agent 23 (S24), and transmits the CoT message directly to the mobile node 21 (S25).

Here, the first and second nonces nonce1 and nonce2 generated by the corresponding node 22 and a secret node key Kcn of the corresponding node 22 are generated in the same manner as the related art.

When the mobile node 21 having received the HoT message and the CoT message is a terminal having normally performed the RR procedure, the corresponding node 21 performs an exclusive OR operation on the HT and the CT to acquire the first nonce nonce1 and the second nonce nonce2, generates the BU message including the exclusive OR of the first nonce nonce1 and the second nonce nonce2, and transmits the BU message to the corresponding node 22 (S26).

Then, the corresponding node 22 extracts the HoCookie included in the HoTI message and the CoCookie included in the CoTI message from the first index index1 and the second index index2 of the received BU message and performs a verification operation by a factorization in prime numbers with the common divisor p included in the BU message. When the verification operation is successfully performed, the corresponding node determines that the BU message is a correct message transmitted through a correct procedure (S27), generates a BA (Binding Ack) message, and transmits the BA message to the mobile node 21 (S28).

On the contrary, when the verification operation is not successful, the corresponding node determines that the BU message is a message transmitted by an attacker, discards the message, and ends the procedure (S29).

FIG. 3 is a diagram illustrating in detail a BU message verifying procedure according to an embodiment of the invention.

When receiving the BU message, the corresponding node 22 extracts the first index index1, the second index index2, and the common divisor p from the BU message (S31).

Here, the corresponding node 22 can acquire the HoCookie included in the stored HoTI message, the CoCookie included in the stored CoTI message, the first nonce nonce1, and the second nonce nonce2 on the basis of the first index index1 and the second index index2 extracted above. The corresponding node 22 checks whether the first nonce nonce1 and the second nonce nonce2 are equal to the first nonce nonce1 and the second nonce nonce2 included in the BU message by an exclusive OR operation. It can be checked whether the terminal receives the HT and the CT generated by the corresponding node 22 by the above-mentioned procedure.

The decoded HT and CT are divided by the common divisor p included in the BU message. That is, the decoded HT and CT are factorized in prime numbers with the common divisor p (S33).

At this time, the cookies are subjected to an exclusive OR operation with the HoA and CoA included in the BU message to generate p×q and p×r. The HoCookie included in the HoTI message and the CoCookie included in the CoTI message are factorized in prime numbers with the common divisor p included in the BU message.

The factorization in prime numbers in step S33 is correctly performed and thus the remainder of the operation in step S33 is "0" (S34), it is determined that the received BU message is a correct message transmitted from the mobile node 21 requesting for the binding update operation (S35).

On the contrary, when the factorization in prime numbers in step S33 is not correctly performed and thus the remainder of the operation in step S33 is not "0" (S34), it is determined that the received BU message is a message generated by an attacker, that is, an incorrect message (S36).

That is, when the decoded HT and CT are factorized in prime numbers with the common divisor p and thus are normally factorized in prime numbers, the binding update procedure operates with the received BU message.

In the invention, the corresponding node 22 and the mobile node 21 share their information (such as, HT, CT, common divisor p, secret node key Kcn, first nonce nonce1, and second nonce nonce2) by the RR procedure and then verify the BU message using the information. Accordingly, it is possible to intercept an attack not knowing the information.

It will be easily understood by those skilled in the art that the invention is not limited to the embodiments and the accompanying drawings, but can be replaced, modified, and changed in various forms without departing from the technical spirit of the invention.

What is claimed is:

1. A binding update method in MIPv6, comprising:
a first step of generating, with a mobile node, a HoTI (Home Test Init) message including a HoA (Home Address) encoded with a product of a first prime number and a second prime number and transmitting, with the mobile node, the HoTI message to a corresponding node through a home agent along with a first index;
a second step of generating, with the mobile node, a CoTI (Care of Test Init) message including a CoA (Care-of Address) encoded with a product of the first prime number and a third prime number and transmitting, with the mobile node, the CoTI message directly to the corresponding node along with a second index;
a third step of generating, with the corresponding node, a HoT (Home of Test) message including a first nonce and transmitting, with the corresponding node, the HoT message to the mobile node through the home agent;
a fourth step of generating, with the corresponding node, a CoT (Care-of Test) message including a second nonce and to transmit transmitting, with the corresponding node, the CoT message to the mobile node;
a fifth step of generating, with the mobile node, a BU (Binding Update) message by adding the first prime number to the first nonce and the second nonce included in the HoTI message and the CoTI message and transmitting, with the mobile node, the BU message to the corresponding node; and
a sixth step of verifying, with the corresponding node, the BU message using an exclusive OR operation and a factorization operation in prime numbers with the first prime number and transmitting, with the corresponding node, a BA (Binding Ack) message to the mobile node.

2. The binding update method according to claim 1, wherein the first step includes performing an exclusive OR operation on the product of the first prime number and the second prime number and the HoA to encode the HoA.

3. The binding update method according to claim 1, wherein the second step includes performing an exclusive OR operation on the product of the first prime number and the third prime number and the CoA to encode the CoA.

4. The binding update method according to claim 2, wherein the third step includes generating a secret node key of the corresponding node and the first nonce and performing an exclusive OR operation on the secret node key and the first nonce to generate the HoT message.

5. The binding update method according to claim 3, wherein the fourth step includes generating a secret node key of the corresponding node and the second nonce and performing an exclusive OR operation on the secret node key and the second nonce to generate the CoT message.

6. The binding update method according to claim 1, wherein the sixth step includes:
extracting the first index and the second index included in the BU message;
decoding the first index and the second index by an exclusive OR operation and separating the secret node key of the corresponding node, the first nonce, the second nonce, the encoded HoA, and the encoded CoA from the BU message;

performing a factorization operation in prime numbers on the encoded HoA and the encoded CoA using the first primer number included in the BU message; and confirming that the BU message is a correct message and transmitting the BA message to the mobile node, when the factorization operation in prime numbers is normally performed.

7. The binding update method according to claim 6, wherein the sixth step includes confirming that the BU message is an abnormal message when the exclusive OR operation or the factorization operation in prime numbers is not normally performed.

* * * * *